(12) United States Patent
Lai

(10) Patent No.: US 8,654,768 B2
(45) Date of Patent: Feb. 18, 2014

(54) SOURCE SPECIFIC TRANSCODING MULTICAST

(75) Inventor: Cheng-Jia Lai, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 436 days.

(21) Appl. No.: 12/713,769

(22) Filed: Feb. 26, 2010

(65) Prior Publication Data

US 2011/0211576 A1   Sep. 1, 2011

(51) Int. Cl.
| | |
|---|---|
| G01R 31/08 | (2006.01) |
| G06F 11/00 | (2006.01) |
| G08C 15/00 | (2006.01) |
| H04L 12/28 | (2006.01) |
| H04L 12/16 | (2006.01) |
| H04Q 11/00 | (2006.01) |

(52) U.S. Cl.
USPC ........... 370/390; 370/229; 370/235; 370/241; 370/252; 370/255; 370/259; 370/263; 370/312

(58) Field of Classification Search
None
See application file for complete search history.

(56) References Cited

U.S. PATENT DOCUMENTS

| | | | | |
|---|---|---|---|---|
| 8,374,113 | B2 * | 2/2013 | Meier et al. | 370/312 |
| 2005/0232232 | A1 * | 10/2005 | Farber et al. | 370/352 |
| 2006/0268697 | A1 | 11/2006 | Oz et al. | |
| 2007/0076714 | A1 | 4/2007 | Ananthakrishnan et al. | |
| 2007/0121723 | A1 * | 5/2007 | Mathew et al. | 375/240.12 |
| 2009/0161590 | A1 * | 6/2009 | Lewis et al. | 370/312 |
| 2009/0201988 | A1 * | 8/2009 | Gazier et al. | 375/240.06 |
| 2009/0327499 | A1 * | 12/2009 | Strickland et al. | 709/228 |
| 2011/0134790 | A1 * | 6/2011 | Jiang | 370/252 |
| 2011/0209025 | A1 * | 8/2011 | Takahashi | 714/752 |

OTHER PUBLICATIONS

PCT/US11/24161 International Search Report and Written Opinion of the International Search Authority dated Jun. 21, 2011.
Shudo et al., "A Framework of a Transcoder Controlling Scheme over Multicast Networks", 2005 Asia-Pacific Conference on Communications, Oct. 3-5, 2005.
S. Bhattacharyya, "An Overview of Source-Specific Multicast (SSM)" RFC 3569, Jul. 2003.
D. Meyer et al., "Source-Specific Protocol Independent Multicast in 232/8" RFC 4608, Aug. 2006.
B. Fenner et al., "Protocol Independent Multicast—Sparse Mode (PIM-SM): Protocol Specification (Revised)" RFC 4601, Aug. 2006.
R. Vida et al., "Multicast Listener Discovery Version 2 (MLDv2) for IPv6" RFC 3810, Jun. 2004.
B. Cain et al., "Internet Group Management Protocol, Version 3" RFC 3376, Oct. 2002.
International Preliminary Report on Patentability for PCT/US11/24161 dated Sep. 7, 2012.

* cited by examiner

Primary Examiner — Hassan Phillips
Assistant Examiner — Lonnie Sweet
(74) Attorney, Agent, or Firm — Tucker Ellis LLP

(57) ABSTRACT

In an example embodiment, there is described herein an apparatus comprising an upstream communication interface configured to receive a multicast stream from a source encoded by a first codec, a downstream communication interface, and routing and transcoding logic coupled to the upstream communication interface and downstream communication interface. The routing and transcoding logic is configured to forward the multicast stream encoded by the first codec unchanged to a first downstream subscriber of the multicast stream. The routing and transcoding logic is configured to replicate the multicast steam and transcode the multicast stream to a second codec for a second downstream subscriber, the replicated, transcoded multicast stream is forwarded to the second downstream subscriber.

19 Claims, 4 Drawing Sheets

US 8,654,768 B2

SOURCE SPECIFIC TRANSCODING MULTICAST

TECHNICAL FIELD

The present disclosure relates generally to data communications such as multicast data communications.

BACKGROUND

SSM (Source Specific Multicast) and other Internet Protocol (IP) layer multicast mechanisms deliver the same IP packets to all subscribing routers, and can save network bandwidth because otherwise each IP packet would be replicated and individually sent from the source to each subscribing host behind those routers, that is, using IP-layer multicast allows the same datagram to travel only once per link in the multicast tree formed by those routers. On the other hand, application-layer multicast (ALM) is a mechanism where the hosts (not necessarily the source) replicate the datagram and relay the datagram via an overlay network formed by their layer-4 connections. ALM is useful when the routers do not support multicast and/or transcoding needs to be handled by the hosts. ALM, however, is much less efficient than IP-layer multicast since ALM usually results in sub-optimal routing and those datagrams may also travel a link more than once. ALM is also not as reliable because hosts may churn on and off line.

BRIEF DESCRIPTION OF THE DRAWINGS

The accompanying drawings incorporated herein and forming a part of the specification illustrate the examples embodiments.

OVERVIEW OF EXAMPLE EMBODIMENTS

Figure 1:
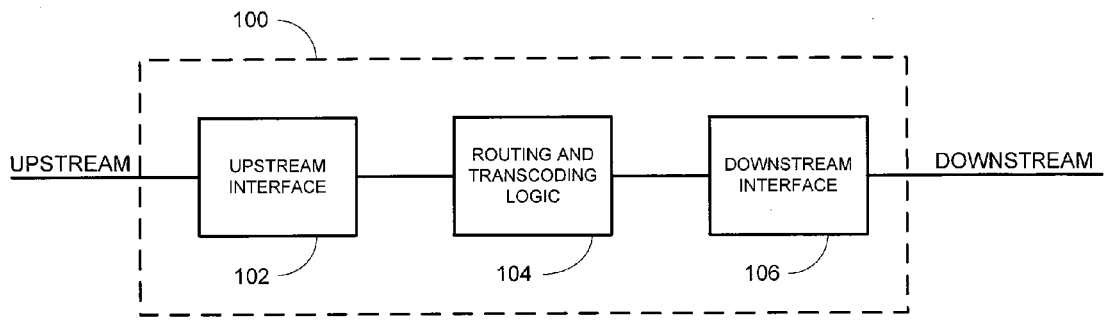
FIG. 1 illustrates an example of an apparatus configured to implement source specific transcoding multicast.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein, an apparatus comprising an upstream communication interface configured to receive a multicast stream from a source encoded by a first codec, a downstream communication interface, and routing and transcoding logic coupled to the upstream communication interface and downstream communication interface. The routing and transcoding logic is configured to forward the multicast stream encoded by the first codec to a first downstream subscriber of the multicast stream. The routing and transcoding logic is further configured to replicate the multicast steam and transcode the multicast stream to a second codec for a second downstream subscriber. The routing and transcoding logic forwards the replicated, transcoded multicast stream to the second downstream subscriber.

In accordance with an example embodiment, there is disclosed herein, a method comprising receiving from an upstream source, a multicast stream formatted for a first codec. The multicast stream is forwarded to at least one downstream subscriber. A request in the form of a subscription message is received from a second downstream subscriber for the multicast stream, wherein the second downstream subscriber requests that the multicast stream is formatted for a second codec. The method further comprises determining whether to continue receiving the multicast stream from the upstream source formatted for the first codec or to receive the multicast stream formatted for the second codec. A request is made that the upstream source provide the multicast stream formatted for the second codec responsive to determining to receive the multicast stream formatted for the second codec. The multicast stream formatted for the second codec is forwarded to the second downstream subscriber responsive to determining to receive the multicast stream formatted for the second codec. A copy of the multicast stream is transcoded and forwarded to the at least one downstream subscriber responsive to determining to receive the multicast stream from the upstream source formatted for the second codec.

Description of Example Embodiments

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment described herein, there is defined a new multicast mechanism, called Source Specific Transcoding Multicast (SSTM), which extends Source Specific Multicast (SSM) and is also based on Reverse Path Forwarding (RPF). SSTM defines an extended multicast subscription message (S, G, C) where S is the multicast source address, G is the multicast group destination address, and C is the codec type requested by the downstream where a codec type can include, but not limited to, the coding algorithm, frame rate, resolution size, and content quality of the stream. SSTM uses a simple algorithm for a router to handle two or more multicast subscription messages that share the same S and G addresses. Each SSTM router adaptively inserts an embedded transcoding service if available, and forwards to its upstream router only those subscriptions that cannot be fed by its embedded transcoding output.

For example, if an SSTM-capable router receives (S, G, C1) and (S, G, C2) and it finds an embedded transcoding service from C1 to C2 available, it internally allocates one such transcoding service session and forwards that allocated transcoding service session, e.g., (S, G, C1), to the upstream router towards S. Alternatively, it may choose to insert a transcoding service from C2 to C1 (instead of from C1 to C2 as above) if available, and forwards (S, G, C2) upstream, depending on whether C1 or C2 consumes less bandwidth or is preferred (for example the preferred codec may be selected by a system administrator). If no embedded transcoding service is available, it simply forwards the streams, e.g., (S, G, C1) and (S, G, C2), to the upstream router towards S.

As will be described in an example embodiment herein, an SSTM-capable router stores each (S, G, C[k]) as one routing table entry for each codec type C[k] subscribed downstream. When the SSTM inserts a transcoding service from C[a] to C[b] with respect to an (S, G) pair, it marks in the routing table that (S, G, C[a]) has a branch to transcoding into (S, G, C[b]), i.e. any packet received from the upstream with matched source address S, multicast address G, and the payload identified with codec C[a] will be internally replicated: The original is sent to the downstream for (S, G, C[a]) while the replica is internally fed to the respective transcoding service session that is responsible to generate packets for (S, G, C[b]) to the downstream, as illustrated in the following example embodiments.

FIG. 1 illustrates an example of an apparatus 100 configured to implement source specific transcoding multicast. Apparatus 100 comprises an upstream interface 102 that is configured to receive a multicast stream from an upstream source. As will be described in example embodiments herein, upstream interface may receive one copy of the multicast stream formatted with a first codec or may receive multiple copies of the stream formatted with corresponding multiple codecs. Downstream interface 106 is employed to provide the multicast stream to downstream subscribers. In an example embedment, upstream subscription messages for the multicast stream may be received via downstream interface 106 and routed to an upstream source of the multicast stream via upstream interface 102. Routing and transcoding logic 104 routes the multicast stream packets from upstream source to downstream subscribers based on those subscription messages received via downstream interface 106. If a downstream subscriber can receive the multicast stream formatted with the first codec, the stream is routed to the downstream subscriber unchanged; however, if a downstream subscriber cannot receive the multicast stream formatted with the first codec, routing and transcoding logic 104 creates a replica of the multicast stream and transcodes the replica to a format compatible with the downstream subscriber. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more In an example embodiment, routing and transcoding logic 104 is configured to forward the multicast stream encoded by the first codec to a first downstream subscriber of the multicast stream. Routing and transcoding logic 104 is further configured to replicate the multicast stream and transcode the multicast stream to a second codec for a second downstream subscriber. Routing and transcoding logic 104 forwards the replicated, transcoded multicast stream to the second downstream subscriber.

In an example embodiment, routing and transcoding logic 104 is responsive to receiving a request in the form of a subscription message for the multicast stream from a third downstream subscriber that employs a third codec to create an additional copy of the multicast steam. The additional copy is transcoded for the third codec and the transcoded additional copy is forwarded to the third downstream subscriber.

In an example embodiment, routing and transcoding logic 104 is responsive to receiving a request from a new downstream subscriber to receive the multicast stream with a new codec to determine whether the new codec is preferred for communicating upstream or to continue using the current codec. If routing and transcoding logic 104 determines to use the new codec, routing and transcoding logic 104 changes the upstream subscription for the multicast stream to employ the new codec. Routing and transcoding logic 104 forwards the multicast stream encoded by the new codec to the new downstream subscriber, and replicates and transcodes the multicast stream as needed to provide the multicast stream to other downstream subscribers.

For example, if routing and transcoding logic 104 was providing the stream to a first downstream subscriber with a first codec and to a second downstream subscriber with a second codec, and a new subscriber requests the multicast stream with a third codec, and the third codec is determined to be the preferred codec, routing and transcoding logic 104 will create a first and second copies of the multicast stream. The first copy will be transcoded to the first codec and provided to the first subscriber. The second copy will be transcoded and provided to the second subscriber.

In an example embodiment, routing and transcoding logic 104 may employ a predefined list to determine which codec is preferred. For example an administrator may input a list in order of priority. In another example embodiment, other parameters such as bandwidth consumption may be used to determine which codec is preferred. For example, routing and transcoding logic 104 may determine which codec is preferred based on which codec consumes less bandwidth.

Figure 2:
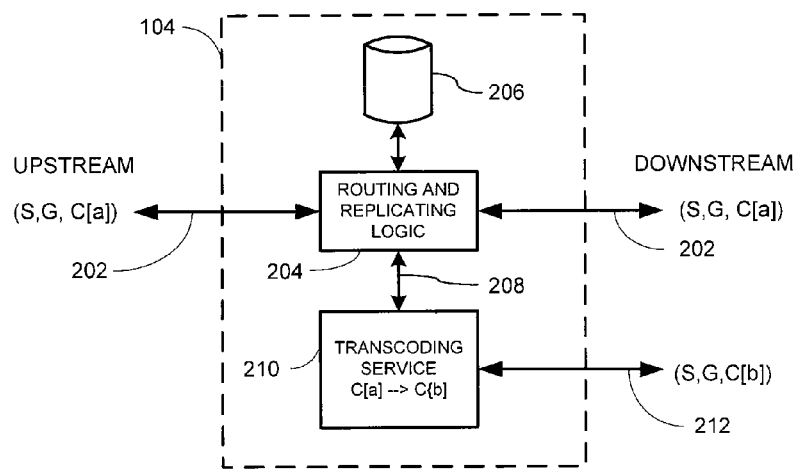
FIG. 2 illustrates an example of routing and transcoding logic configured to replicate packets and perform transcoding services.

In an example embodiment, routing and transcoding logic 104 stores each (S, G, C[k]) as one routing table entry for each codec type C[k] subscribed by at least one downstream subscriber. When routing and transcoding logic 104 inserts a transcoding service from C[a] to C[b] with respect to an (S, G) pair, routing and transcoding logic 104 stores in the routing table that (S, G, C[a]) has a branch to transcoding into (S, G, C[b]), e.g., any packet received from the upstream with matched source address S, multicast address G, and the payload identified with codec C[a] will be internally replicated: The original is sent all those downstream interfaces with subscription (S, G, C[a]) while the replica is internally fed to the respective transcoding service session that is responsible to generate packets for all those downstream interfaces with subscription (S, G, C[b]). FIG. 2 described herein infra describes an example embodiment performing this functionality.

Note that the number of upstream interfaces, and downstream interfaces are not limited by the number shown in the examples illustrated herein as these numbers were selected merely for ease of illustration and those skilled in the art should readily appreciate that any physically realizable number of upstream and downstream interfaces are suitable for implementing the principles of the example embodiments described herein. Moreover, any physically realizable number of downstream multicast streams may be provided. Furthermore, although the examples illustrated herein describe a first subscriber and second subscriber, those skilled in the art should readily appreciate (as will also be illustrated in an example described herein in FIG. 4 infra) that the first and/or subscriber may be a group. For example, the first subscriber may include multiple downstream routers.

FIG. 2 illustrates an example of a block diagram for implementing routing and transcoding logic 104. In the illustrated embodiment, a multicast stream 202 (S,G,C[a]) is received from an upstream source. Responsive to receiving a packet, Routing and replicating logic 204 performs a lookup in table 206 to determine downstream subscribers of the stream. In the illustrated example, a first downstream subscriber receives multicast stream 202 unchanged. A second downstream subscriber receives the stream encoded by a second codec (C[b]). Accordingly, replica of the stream is provided via path 208 to transcoding service 210 that transcodes the stream from codec C[a] to codec C[b]. The replicated, transcoded stream 212 is provided to the second subscriber. In a particular embodiment, the same downstream recipient, e.g., a non-SSTM capable router, may receive both streams 202, 212.

Figure 3:
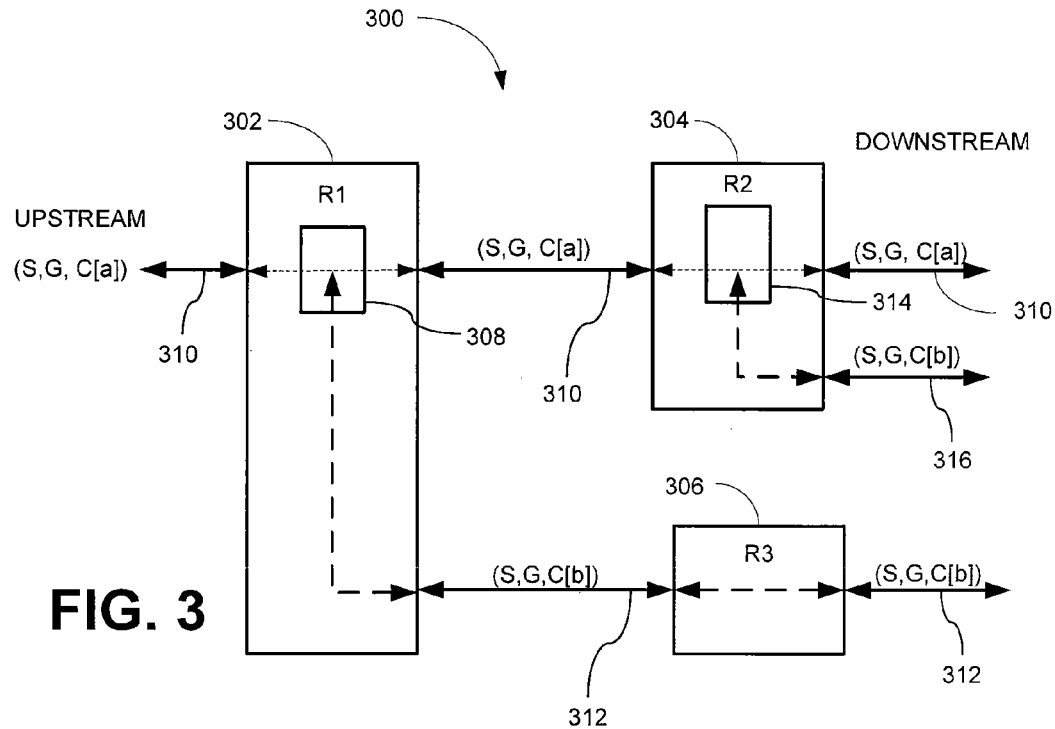
FIG. 3 illustrates an example of a system where a first upstream router provides transcoding services and one of the downstream routers also provides transcoding services.

FIG. 3 illustrates an example of a system 300 where a first upstream router 302 provides transcoding services and one of the downstream routers 304 also provides transcoding services. In this example, routers R1 302 and R2 304 are SSTM capable. The multicast stream is received from an upstream source employing a first codec, stream (S,G,C[a]) 310. Routing and transcoding logic 308 (which in an example embodiment may be configured as described in an example embodiment for routing and transcoding logic 104) determines how to distribute stream 310 and 312 downstream. In this example, Routing and Transcoding logic 308 determines that R2 304 receives stream 310 unchanged but that Router (R3) 306 employs codec C[b] and thus receives stream 312.

R2 304, a downstream subscriber of stream (S, G) from R1 302, is capable of receiving the multicast stream employing the first codec (S, G, C[a]) 310 unchanged. Since R2 is a SSTM capable router, routing and transcoding logic 314, (which in an example embodiment may be configured as described in an example embodiment for routing and transcoding logic 104), determines the downstream distribution of stream 310 from R2 304. In this example, Stream 310 is distributed unchanged, and a replicated, transcoded copy of the stream 310, (S, G, C[b]) 316 which employs a second codec, C[b], is distributed downstream.

Routing and transcoding logic 308 provides a replicated, transcoded copy (S, G. C[b]) 312 of stream 310 to R3 306. R3 306 distributes stream 312 downstream. In an example embodiment, R3 306 is also a SSTM router, however, R3 306 may not be able to receive stream (S,G,C[a]) 310 so routing and transcoding 308 transcodes stream (S,G,C[a]) 310 to the appropriate stream (S,G,C[b]) 312 for R3 306, which may then provide replicated, transcoded streams (not shown) downstream.

Figure 4:
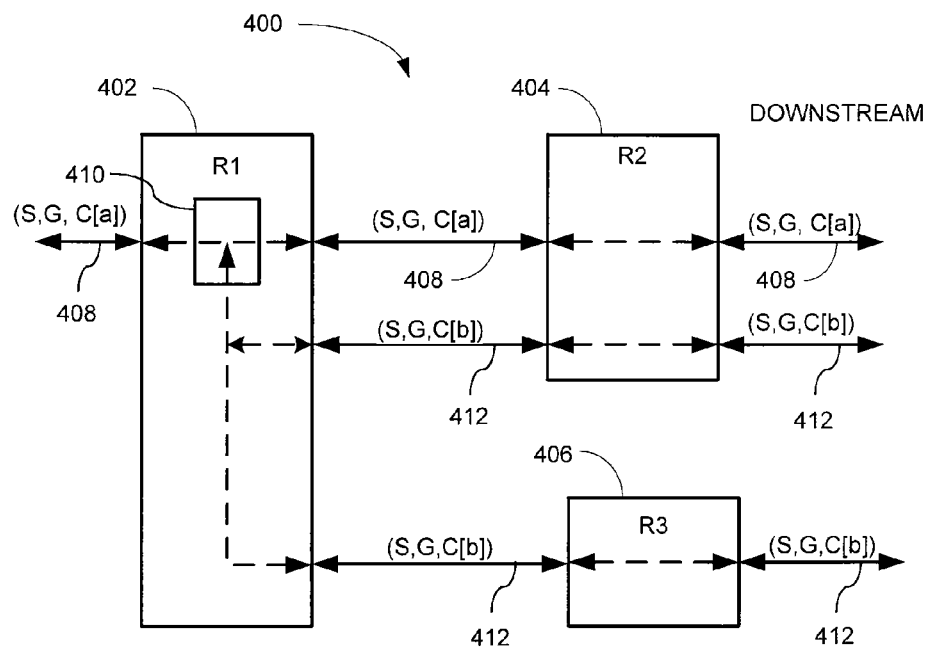
FIG. 4 illustrates an example of a system where an upstream router provides all transcoding services for downstream routers.

FIG. 4 illustrates an example of a system 400 where an upstream router R1 402 provides all transcoding services for downstream routers. Multicast stream (S, G) is provided employing a first codec (C[a]), (S, G, C[a]), 408 from an upstream source (not shown) and distributed to routers R2 404 and R3 406.

In the illustrated example, routing transcoding logic 410, (which in an example embodiment may be configured as described in an example embodiment for routing and transcoding logic 104), determines that R2 404 should receive the multicast stream employing the first codec (S, G, C[a]) 408 and employing a second codec (S, G, C[b]) 412.

Routing and transcoding logic also determines that the multicast stream should be provided to router R3 406 employing the second codec, (S, G, C[b]) 412.

R2 404 distributes the multicast stream employing the first codec (S, G, C[a]) 408 and employing the second codec (S, G, C[b]) 412 downstream. R3 406 distributes the multicast stream employing second codec (S, G, C[b]) 412 downstream.

From the foregoing, if all routers in the multicast paths are SSTM-capable, the resulting SSTM tree should provide optimal transcoding locations for the most efficient bandwidth use. Consider the examples illustrated in FIGS. 3 and 4. Ideally, the downstream paths for (S, G, C[a]) and (S, G, C[b]) use different network interfaces at this SSTM-capable router. That means there are two downstream SSTM-capable routers, one subscribing to (S, G, C[a]) while the other to (S, G, C[b]). The upstream bandwidth savings is realized from not having to transmit the (S, G, C[b]) packets which would be necessary without the transcoding service. For example, in FIG. 3, no (S, G, C[b]) packets are transmitted (or received) upstream of R1 302 and R2 304, and in FIG. 4, no (S, G, C[b]) packets are transmitted (or received) upstream of R1 402.

Figure 5:
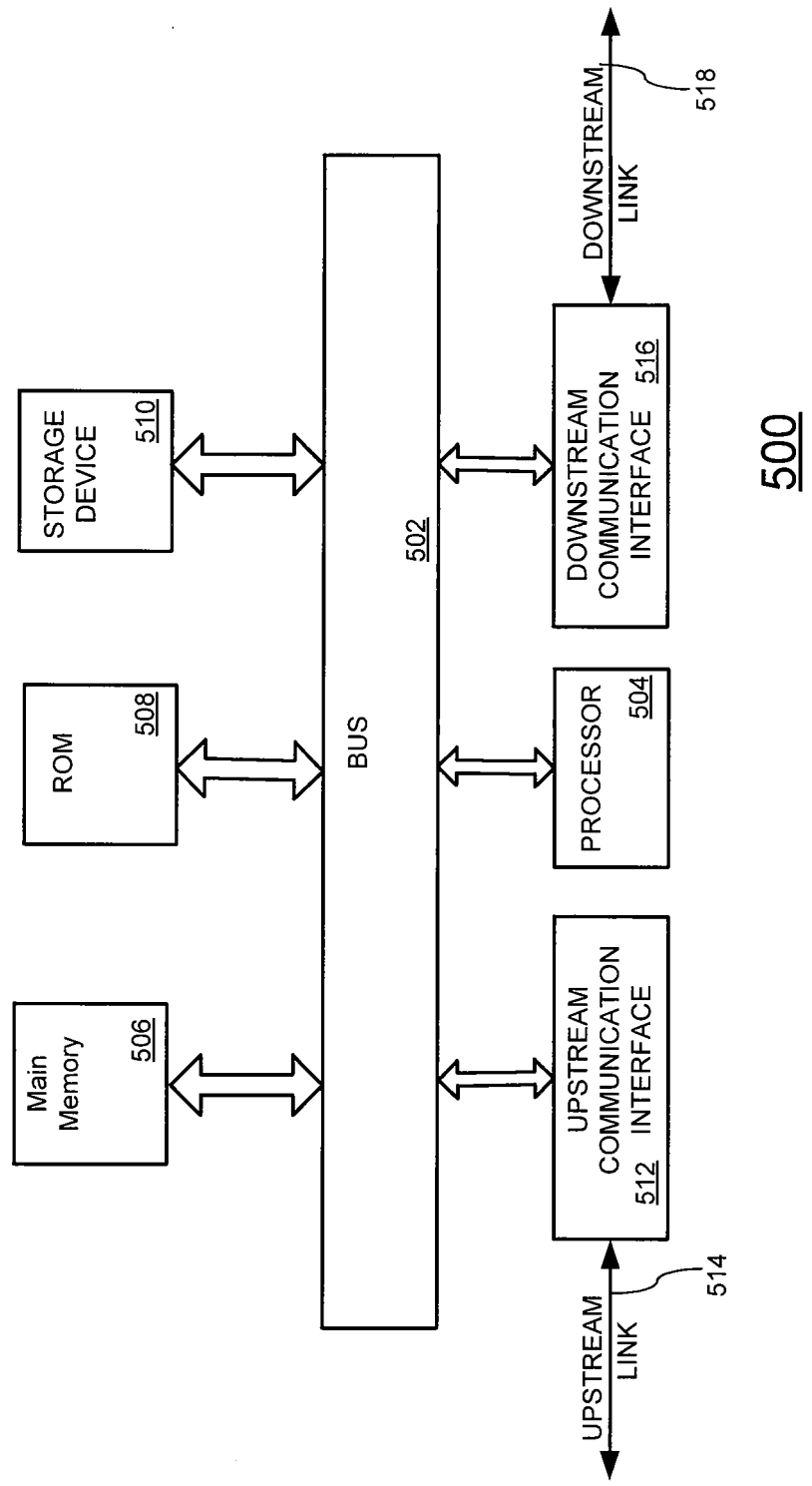
FIG. 5 illustrates an example of a computer system upon which an example embodiment may be implemented.

FIG. 5 is a block diagram that illustrates a computer system 500 upon which an example embodiment may be implemented. In accordance with example embodiments, computer system 500 can be configured to implement Routing and Transcoding Logic 104 (FIG. 1), Routing and Replicating Logic 204 (FIG. 2), Transcoding Service 210 (FIG. 2), Transcoding Logic 308 and/or 314 (FIG. 3), and/or Transcoding Logic 410 (FIG. 4). Computer system 500 is also suitable for implementing methodology 600 (FIG. 6), methodology 700 (FIG. 7), and/or methodology 800 (FIG. 8), which will be described in further detail herein infra.

Computer system 500 includes a bus 502 or other communication mechanism for communicating information and a processor 504 coupled with bus 502 for processing information. Computer system 500 also includes a main memory 506, such as random access memory (RAM) or other dynamic storage device coupled to bus 502 for storing information and instructions to be executed by processor 504. Main memory 506 also may be used for storing a temporary variable or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

An aspect of the example embodiment is related to the use of computer system 500 for performing Source Specific Transcoding Multicast. According to an example embodiment, Source Specific Transcoding Multicast is provided by computer system 500 in response to processor 504 executing one or more sequences of one or more instructions contained in main memory 506. Such instructions may be read into main memory 506 from another computer-readable medium, such as storage device 510. Execution of the sequence of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 504 for execution. Such a medium may take many forms, including but not limited to non-volatile media, and volatile media. Non-volatile media include for example optical or magnetic disks, such as storage device 510. Volatile media include dynamic memory such as main memory 506. As used herein, tangible media may include volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Computer system 500 also includes an upstream communication interface 512 coupled to bus 502. Upstream communication interface 512 provides a two-way data communication coupling computer system 500 to an upstream link 514 that is connected to a first network (not shown).

Computer system 500 also includes a downstream communication interface 516 coupled to bus 502. Downstream communication interface 516 provides a two-way data communication coupling computer system 500 to a downstream link 518 that is connected to a second network (not shown).

Figure 6:
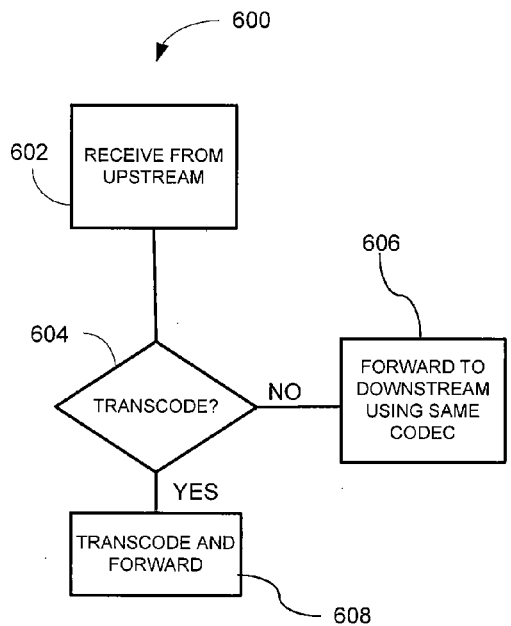
FIG. 6 illustrates an example of a methodology for providing downstream transcoding service.
Figure 7:
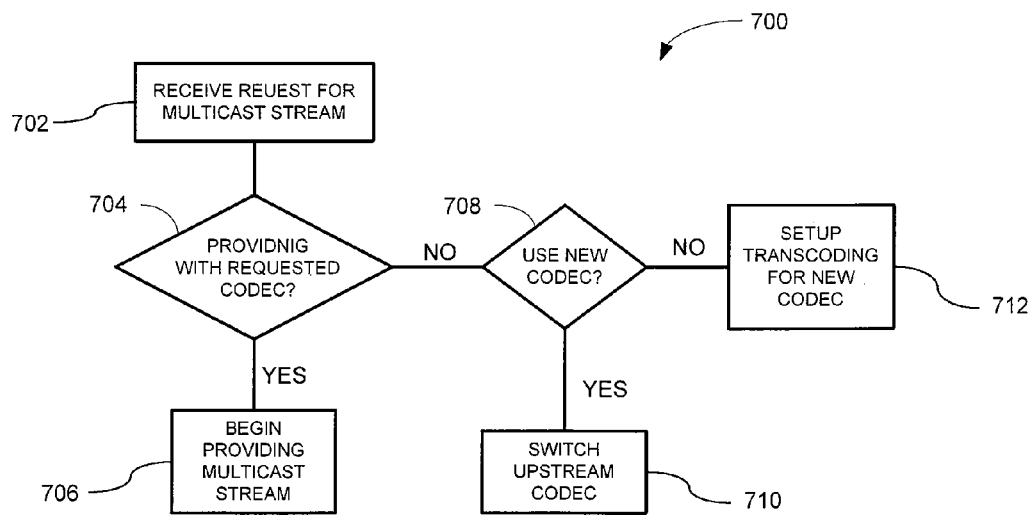
FIG. 7 illustrates an example of a methodology for providing transcoding service when a new downstream multicast stream is requested.

In view of the foregoing structural and functional features described above, a methodology in accordance with an example embodiment will be better appreciated with reference to FIGS. 6-7. While, for purposes of simplicity of explanation, the methodologies of FIGS. 6-7 are shown and described as executing serially, it is to be understood and appreciated that the example embodiments are not limited by the illustrated orders, as some aspects could occur in different orders and/or concurrently with other aspects from that shown and described herein. Moreover, not all of the illustrated features may be required to implement a methodology in accordance with an aspect of an example embodiment. The methodologies described herein are suitably adapted to be implemented in hardware, by a processor executing software, or a combination thereof.

FIG. 6 illustrates an example of a methodology 600 for providing downstream transcoding service. Methodology 600 may be implemented by routing and transcoding logic 104 (FIG. 1), routing and transcoding logic 308 (FIG. 3), routing and transcoding logic 314 (FIG. 3), routing and transcoding logic 410 and/or processor 504 (FIG. 5).

At 602, a packet for a multicast stream is received from an upstream source. The packet employs a first codec.

At 604, a determination is made whether the packet is to be distributed downstream employing the first codec, and/or with a different, e.g. second, third, etc., codec. For example, multicast stream may be provided to multiple subscribers employing a plurality of codecs, and/or to one or more single subscribers employing multiple codecs. For example in FIG. 3, R1 302 provides a copy of the packet employing the first codec to R2 304 and a copy of the packet employing the second codec to R3 306; and in FIG. 4 R1 402 distributes multicast stream twice to R2 404, first the multicast stream employing the first codec and a copy employing the second codec, and a copy of the stream employing the second codec to R3 406.

At 606, downstream subscribers that employ the same codec as the upstream source and can receive the packets without transcoding (NO) receive the packet (or a copy of the packet). Packets are forwarded to these downstream subscribers unchanged, e.g., the payload is not changed.

At 608, downstream subscribers that employ different codecs (YES), receive a replicated, transcoded copy of the packet. In an example embodiment, downstream subscribers may receive multiple copies of the packet, e.g., one copy transcoded to a second codec, another copy transcoded to a third codec and/or a copy of the packet employing the first codec, etc. Thus, packets are replicated and transcoded as needed.

FIG. 7 illustrates an example of a methodology 700 for providing transcoding service when a new downstream multicast stream is requested. Methodology 700 may be implemented by routing and transcoding logic 104 (FIG. 1), routing and transcoding logic 308 (FIG. 3), routing and transcoding logic 314 (FIG. 3), routing and transcoding logic 410 and/or processor 504 (FIG. 5).

At 702, a request is received for a multicast stream from a new downstream subscriber. The request for the multicast stream includes a codec type.

At 704, a determination is made whether the multicast stream is already being provided to a downstream subscriber with the requested codec. Note that the requested codec may not be the same codec as the upstream codec, for example another downstream subscriber may already be receiving replicated, transcoded packets for the multicast stream.

If a downstream subscriber is already receiving the multicast stream with the same coded (YES), at 706 the stream is provided to the new downstream subscriber. The new subscriber may receive replicated, transcoded copies of packets for the multicast stream if needed.

If at 704, a determination is made that the multicast stream is not already being provided (NO), at 708 a determination is made whether to employ the requested codec for upstream communications. For example, if the codec for the new downstream subscriber uses less bandwidth and/or processor resources, etc. than the codec currently being used to communicate with the upstream source, the codec for the new subscriber may be used for upstream communications. In an example embodiment, a preferred codec list may be employed for determining which codec to use for upstream communications considering various factors such as the content quality and bandwidth of each codec, any irreversible quality degradation by transcoding, local resource availability for transcoding, etc.

If at 708 the determination is made to employ the new codec for upstream communications (YES), at 710 the upstream codec is switched to the new codec. After switching to the new codec, packets destined for downstream subscribers using the original upstream codec will be transcoded. For example, if a second codec is installed as the codec for upstream communications, packets for downstream subscribers employing a first codec will be transcoded from the second codec to the first codec.

If at 708, a determination is made to continue using the original codec for upstream communications (NO) at 712 resources are allocated for transcoding packets from the original codec to the new codec for the new downstream subscriber. Optionally, transcoding may be setup for upstream packets from the new subscriber to transcode to the upstream codec. Once transcoding can be performed, the multicast stream is provided to the new downstream subscriber.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
an upstream communication interface configured to receive from an associated source a multicast stream;
a downstream communication interface; and,
routing and transcoding logic operatively coupled with the upstream communication interface and operatively coupled with the downstream communication interface;
the routing and transcoding logic receives a request for the multicast stream from a first subscriber requesting the stream encoded by a first encoder;
the routing and transcoding logic receives a request for the multicast stream from a second subscriber requesting the stream encoded by a second encoder;
the routing and transcoding logic selects the first codec for receiving the stream from the associated source responsive to determining the first codec is a preferred codec;
the routing and transcoding logic requests the multicast stream from the associated source encoded by the first codec responsive to selecting the first codec for receiving the stream from the associated source;
wherein the routing and transcoding logic is configured to forward unchanged the multicast stream encoded by the first codec to the first downstream subscriber of the multicast stream encoded by the first codec;
wherein the routing and transcoding logic is configured to replicate the multicast stream encoded by the first codec and transcode the multicast stream encoded by the first codec to a multicast stream encoded by a second codec; and
wherein the routing and transcoding logic is configured to forward the multicast stream encoded by the second codec to the second downstream subscriber of the multicast stream encoded by the second codec.

2. The apparatus set forth in claim 1, wherein:
the routing and transcoding logic is responsive to receiving a request from an associated third downstream subscriber for the multicast stream encoded by a third codec to create a second copy of the multicast steam encoded by the first codec and to transcode the second copy of the multicast stream encoded by the first codec to a multicast stream encoded by the third codec; and
the routing and transcoding logic is configured to forward the multicast stream encoded by the third codec to the associated third downstream subscriber.

3. The apparatus set forth in claim 1, wherein:
the routing and transcoding logic is responsive to receiving a request from an associated third downstream subscriber to receive the multicast stream encoded by a third codec to determine whether the third codec is preferred for communicating upstream;
the routing and transcoding logic is configured to change the upstream subscription for the multicast stream to employ the third codec responsive to determining the third codec is preferred for communicating upstream;
the routing and transcoding logic is configured to forward the multicast stream encoded by the third codec to the associated third downstream subscriber;
the routing and transcoding logic is configured to create a first copy of the multicast stream encoded by the third codec and to transcode the first copy of the multicast stream encoded by the third codec to a multicast stream encoded by the first codec, and to forward the multicast stream encoded by the first codec to the first associated downstream subscriber; and,
the routing and transcoding logic is configured to create a second copy of the multicast stream encoded by the third codec and to transcode the second copy of the multicast stream encoded by the third codec to a multicast stream encoded by the second codec, and to forward the multicast stream encoded by the second codec to the associated second downstream subscriber.

4. The apparatus set forth in claim 3, wherein the routing and transcoding logic determines a preferred codec based on a predefined list.

5. The apparatus set forth in claim 3, wherein the routing and transcoding logic determines a preferred codec based on which codec consumes less bandwidth.

6. The apparatus set forth in claim 1, wherein the routing and transcoding logic stores an entry in a routing table for each codec type for the multicast stream subscribed by an associated downstream subscriber.

7. The apparatus set forth in claim 6, wherein the routing and transcoding logic determines for each type of codec whether to forward the received multicast stream, or whether to replicate the multicast stream and transcode the multicast stream for the type of codec and forward the transcoded copy of the stream.

8. The apparatus set forth in claim 1, wherein the routing and transcoding logic is further configured to replicate and forward the multicast stream encoded by the second codec to the associated first downstream subscriber.

9. A method, comprising:
receiving a request for the multicast stream from a first subscriber requesting the stream encoded by a first encoder;
receiving a request for the multicast stream from a second subscriber requesting the stream encoded by a second encoder;
selecting the first codec for receiving the stream from the associated source responsive to determining the first codec is a preferred codec;
requesting the multicast stream from the associated source encoded by the first codec responsive to selecting the first codec for receiving the stream from the associated source;
receiving from the upstream source, the multicast stream formatted for the first codec;
selectively forwarding unchanged the multicast stream formatted for the first codec to at least one associated first downstream subscriber employing the first codec;
replicating the multicast stream and transcoding the replicated multicast stream to a second codec; and
forwarding the replicated, transcoded multicast stream to the second subscriber;
replicating the multicast stream;
transcoding a replicated copy of the multicast stream formatted for the first codec to a multicast stream formatted for the second codec; and
forwarding the transcoded copy of the multicast stream formatted for the second codec to the second downstream subscriber.

10. The method set forth in claim 9, wherein determining whether to continue receiving the multicast stream from the upstream source formatted for the first codec or to receive the multicast stream formatted for the second codec is based on a predefined list.

11. The method set forth in claim 9, wherein determining whether to continue receiving the multicast stream from the upstream source formatted for the first codec or to receive the multicast stream formatted for the second codec is based on which codec consumes less bandwidth.

12. The method set forth in claim 9, further comprising storing an entry in a routing table for each codec type for the multicast stream subscribed by an associated downstream subscriber.

13. The method set forth in claim 9, further comprising:
receiving a request from an associated third downstream subscriber for the multicast stream, wherein the associated third downstream subscriber requests that the multicast stream is formatted for a third codec;
determining whether to continue receiving from the upstream source the multicast stream formatted for the second codec or to receive the multicast stream formatted for the third codec;
requesting the upstream source provide the multicast stream formatted for the third codec responsive to determining to receive the multicast stream formatted for the third codec;
forwarding unchanged the multicast stream formatted for the third codec to the associated third downstream subscriber responsive to determining to receive the multicast stream formatted for the third codec;
transcoding a copy of the multicast stream formatted for the first codec and forwarding the transcoded copy of the multicast stream formatted for the first codec to the at least one associated first downstream subscriber responsive to determining to receive the multicast stream formatted for the second codec; and
transcoding a second copy of the multicast stream formatted for the third codec to a multicast stream formatted for the first codec and forwarding the transcoded second copy of the multicast stream to the at least one associated downstream subscriber employing the first codec responsive to determining to receive the multicast stream formatted for the third codec.

14. The method set forth in claim 9, further comprising:
determining the associated second downstream subscriber is also to be provided with a copy of multicast stream formatted for the first codec; and
forwarding a copy of the multicast stream formatted for the first codec to the associated second downstream provider responsive to determining the associated second downstream subscriber is also to be provided with a copy of the multicast stream formatted for the first codec.

15. The method set forth in claim 9, further comprising storing routing data for each codec type having at least one associated downstream subscriber for the multicast stream.

16. The method of claim 15, further comprising determining for each codec type whether to forward the multicast stream or whether to forward a replicated and transcoded copy of the multicast stream.

17. An apparatus, comprising:
an upstream communication interface configured to receive from an associated source a multicast stream;
a downstream communication interface;
means for receiving a request for the multicast stream from a first subscriber requesting the stream encoded by a first encoder;
means for receiving a request for the multicast stream from a second subscriber requesting the stream encoded by a second encoder;
means for selecting a codec, the means for selecting a codec selects the first codec for receiving the stream from the associated source responsive to determining the first codec is a preferred codec;
means for requesting the multicast stream from the associated source encoded by the first codec responsive to selecting the first codec for receiving the stream from the associated source;
means for routing and transcoding operable to forward unchanged the multicast stream encoded by the first codec to an associated first downstream subscriber via the downstream communication interface;
wherein the means for routing and transcoding is further operable to replicate and transcode the multicast stream encoded by the first codec to a multicast stream encoded by a second codec, and forward the replicated, transcoded multicast stream encoded by the second codec to an associated second downstream subscriber via the downstream interface.

18. The apparatus of claim 17, wherein the means for routing and transcoding is further operable to also forward the replicated, transcoded multicast stream to the associated first downstream subscriber.

19. The apparatus of claim 17, wherein:
the means for routing and transcoding is further operable to receive a first upstream request for a second multicast stream from an associated third downstream subscriber employing a third codec;
the means for routing and transcoding is further operable to determine a codec for the associated source for the second multicast stream;
the means for routing and transcoding is further operable to transcode the first request to the codec for the source of the second multicast stream and to forward the transcoded first upstream request;
the means for routing and transcoding is further operable to receive a second upstream request for the second multicast stream from an associated fourth downstream subscriber employing a fourth codec to maintain data associating the fourth codec with the second multicast stream; and
the means for transcoding and routing is further operable to replicate and transcode the second multicast stream for the fourth codec and to forward the replicated, transcoded second multicast stream to the associated fourth subscriber.

\* \* \* \* \*